United States Patent [19]

Staub, Jr.

[11] 4,252,226
[45] Feb. 24, 1981

[54] TORSIONAL VIBRATION DAMPER FOR A TORQUE CONVERTER CLUTCH

[75] Inventor: Vincent M. Staub, Jr., Dayton, Ohio

[73] Assignee: General Motors Corporation, Detroit, Mich.

[21] Appl. No.: 67,328

[22] Filed: Aug. 17, 1979

[51] Int. Cl.$^3$ .............................................. F16D 3/14
[52] U.S. Cl. .................................. 192/106.1; 192/55; 74/411
[58] Field of Search ................... 192/106.1, 55, 3.28, 192/3.29; 74/411; 64/27 NM, 27 R

[56] References Cited

U.S. PATENT DOCUMENTS

| | | | |
|---|---|---|---|
| 3,039,578 | 6/1962 | Peras | 192/106.1 |
| 3,628,353 | 12/1971 | Armstrong | 192/106.1 |
| 3,811,545 | 5/1974 | Sato et al. | 192/106.1 |
| 4,105,102 | 8/1978 | Nels | 192/106.1 |
| 4,138,003 | 2/1979 | Malloy | 192/3.29 |

*Primary Examiner*—George H. Krizmanich

*Attorney, Agent, or Firm*—Donald F. Scherer

[57] ABSTRACT

A vibration damper for a torque converter clutch has elastomeric bands disposed to transmit torque between the clutch input member and the clutch output member while simultaneously permitting relative angular movement between the members to reduce the torsional vibration imposed on the input member. The elastomeric bands are connected to a clutch pressure plate and a gear member which is rotatably mounted on the pressure plate and meshes with a gear drivingly formed on the output member. The input member and output member undergo angular excursions relative to each other during torque transmission such that the gear member rotatably mounted on the pressure plate rotates due to its meshing engagement to increase the stress in the elastomeric band to a value commensurate with the torque transmitting level of the clutch. The torque input to the clutch is thus transmitted through the elastomeric band and the meshing gears to the clutch output member.

2 Claims, 2 Drawing Figures

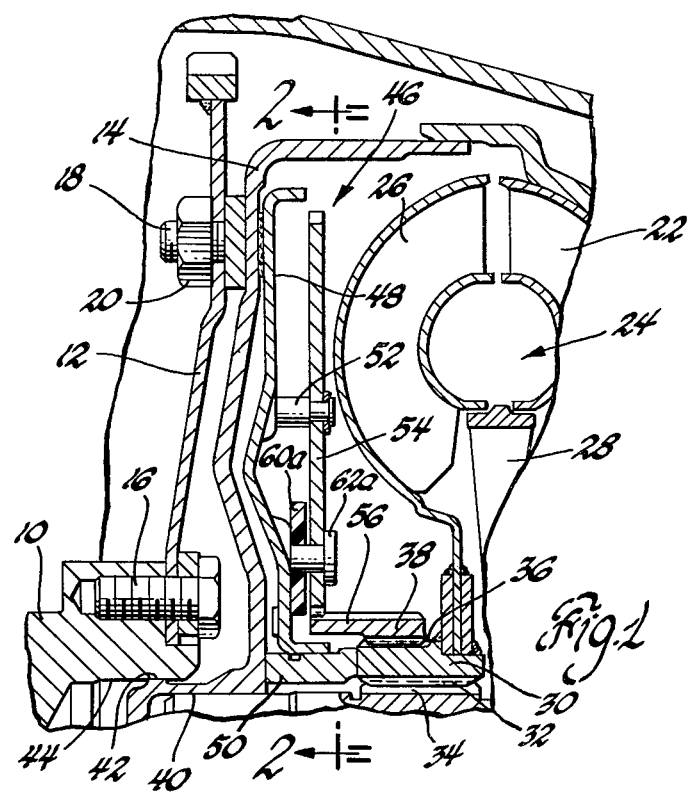
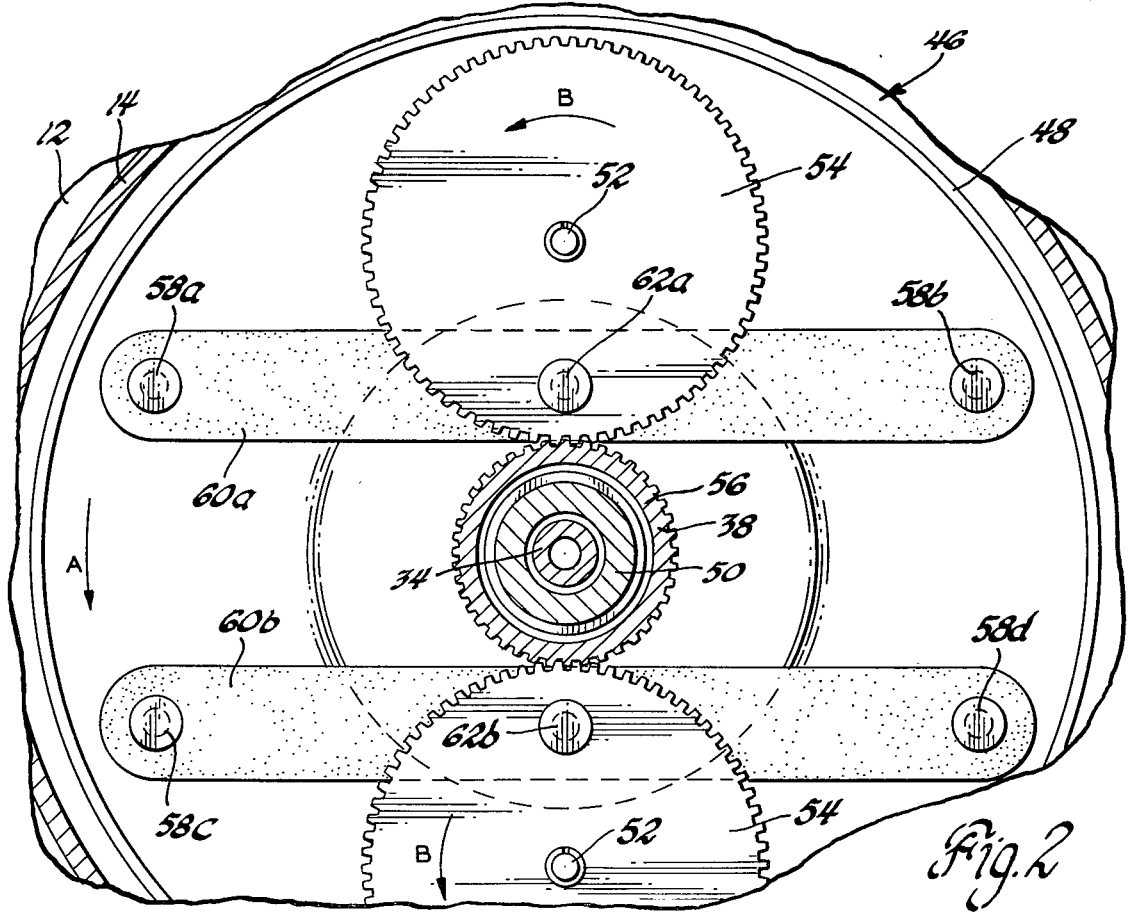

TORSIONAL VIBRATION DAMPER FOR A TORQUE CONVERTER CLUTCH

This invention relates to torsional vibration dampers and more particularly to torsional vibration dampers having an elastomeric member disposed in the torque path between the input and output members.

It is an object of this invention to provide an improved torsional vibration damper for a single plate torque converter clutch wherein an elastomeric member is disposed between the clutch input and output members to permit relative angular displacement therebetween whereby torsional vibrations are accommodated.

It is another object of this invention to provide a torsional vibration damper for a torque converter clutch wherein an elastomeric band member is disposed chordally on a clutch disc and has the center thereof connected to a gear member rotatably mounted on the disc and meshing with a gear member formed on the clutch output member so that the resilient properties of the elastomeric band will permit relative angular displacement between the input and output members during torque transmission to accommodate torsional vibrations.

These and other objects and advantages of the present invention will be more apparent from the following description and drawings in which:

FIG. 1 is a cross-sectional elevational view of a torque converter clutch and vibration damper; and FIG. 2 is a view taken along line 2—2 of FIG. 1.

Referring to the drawings, wherein the same characters represent the same or corresponding parts throughout the several views, there is seen in FIG. 1 an engine crankshaft 10 which has secured thereto a flex plate 12 which in turn is connected to an input shell 14. The flex plate 12 is secured to the engine crankshaft 10 by a plurality of fasteners 16 and is made fast with the input shell 14 by a threaded lug 18 and a fastener 20. The input shell 14 is secured to an impeller 22 which is a component in a conventional torque converter, generally designated 24, which also includes a turbine member 26 and a stator element 28. The torque converter 24 operates in a conventional manner.

The turbine 26 includes an output hub 30 which has a splined inner diameter 32 drivingly connected with an output shaft 34 and a splined outer diameter 36 meshing with a clutch output hub 38. The output shaft 34 is rotatably supported in a bore 40 which is formed in the input shell 14 which input shell also has an annular supporting surface 42 which is rotatably disposed in a bore 44 formed in the crankshaft 10.

Disposed between the turbine 26 and the input shell 14 is a torque converter and damper assembly, generally designated 46, and including a clutch pressure plate or disc 48 slidably and rotatably disposed on a spacer member 50 positioned between the hub 30 and the input shell 14. The pressure plate 48 has secured thereto a pair of pins 52, each of which has rotatably mounted thereon a gear member 54. The gear members 54 mesh with a gear 56 formed integrally with the clutch output hub 38. Also connected to the clutch pressure plate 48 is a plurality of pins 58a through 58d, which are connected to respective ends of elastomeric bands 60a and 60b which extend between pairs of pins 58a, 58b and 58c, 58d, respectively, in a chordal relationship with the pressure plate 48. The centers of the elastomeric bands 60a and 60b are connected by respective pins 62a and 62b with respective gears 54.

The clutch pressure plate 48, gears 54 and 56 are quite similar to a planetary gear arrangement in that the center of gears 54 must rotate with the pressure plate 48 while the gears 54 themselves are free to rotate about mounting pin 52. The clutch plate 58 is selectively engageable with the input shell 14 by reversing flow through the torque converter 24 in a well-known manner. When the pressure plate 48 is engaged with the input shell 14, torque is transmitted from the engine through pressure plate 48 to gears 54 which are meshing with the gear 56.

By way of example, if the gear 56 is held stationary by a heavy load on shaft 34, and the clutch pressure plate 48 is rotated in the direction of Arrow A, the gears 54 will be forced to rotate on their axes in the direction of Arrows B, thus elongating the portion of elastomeric bands 60a and 60b between pin 58a and pin 62a and between pin 58d and pin 62b. This elongation is the result of gear 54 being required to rotate relative to gear 56.

The force required to increase the length of elastomeric band 60 is transmitted through the gear mesh to the output shaft 34. When the force in band 60 is sufficient to rotate the output shaft 34, clutch plate 48 and output hub 38 are rotated in unison.

In actual operation, the shaft 34 will never be stationary when the clutch plate 48 is engaged. However, the shaft 34, will, because of the vehicle road load, lag behind clutch plate 48 resulting in relative angular excursion between clutch plate 48 and clutch outpt hub 38 as long as the road load torque is being transmitted through the elastomeric bands 60. When torsional vibrations resulting from internal combustion engine operation are imposed upon the clutch plate 48, the elastomeric bands 60 will expand and contract to accommodate the torsional fluctuations while simultaneously transmitting the basic DC level of torque transmission. While some amount of AC torque transmission will pass through the vibration damper, this transmission is usually at a frequency which is not disturbing to the operator.

The portion of the elastomeric band disposed between pin 62a and pin 58b and between pin 62b and pin 58c will accommodate torsional vibrations which occur during vehicle coasting. As is well known, during vehicle coasting, drive is from the output member reversely through the clutch to the engine.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A single plate clutch and torsional vibration damper comprising; input means including a disc for accepting drive torque; input gear means rotatably mounted on said disc; output means for delivering drive torque; gear means rotatable with said output means and meshing with said input gear means; and elastomeric band means extending chordally of said disc, having the ends thereof secured to said disc and the center thereof secured to said input gear means, said elastomeric band means being operable to establish drive torque transmission between said input means and output means through said meshing gear means while permitting relative angular rotation between said input means and output means to accommodate torsional vibrations.

2. A single plate clutch and torsional vibration damper for a torque converter clutch comprising; input means including a friction disc for accepting drive torque; input gear means rotatably mounted on said friction disc; output means for delivering drive torque; gear means integral with said output means and meshing with said input gear means; and elastomeric band means extending chordally of said disc, having the ends thereof secured to said disc and the center thereof secured to said input gear means, said elastomeric band means being operable to establish drive torque transmission between said input means and output means through said meshing gear means while permitting relative angular rotation between said input means and output means to accommodate torsional vibrations.

* * * * *